United States Patent [19]

Alphen

[11] 4,075,469
[45] Feb. 21, 1978

[54] LIGHTING SYSTEMS FOR MOTOR CYCLES

[76] Inventor: Jacques Marius Alphen, 67, Allee Jules Verne, La Celle Saint-Cloud, France

[21] Appl. No.: 641,212

[22] Filed: Dec. 16, 1975

[30] Foreign Application Priority Data

Dec. 19, 1974 France .................................. 74 42130

[51] Int. Cl.² .............................................. B62J 5/02
[52] U.S. Cl. ........................................ 362/72; 362/276
[58] Field of Search ................ 240/7.55, 8.25, 7.1 LJ, 240/61, 61.1, 61.2, 61.3, 61.4, 61.5, 61.9, 62 R, 62 B, 62 H, 62.1, 62.2, 62.3, 62.4

[56] References Cited

U.S. PATENT DOCUMENTS

| 2,557,590 | 6/1951 | Beckerman et al. ............... 240/62 R |
| 2,606,999 | 8/1952 | Tostevin ........................... 240/62 R |

Primary Examiner—L. T. Hix
Assistant Examiner—Alan Mathews
Attorney, Agent, or Firm—Alan H. Levine

[57] ABSTRACT

A system for the automatic correction of the orientation of the beam of light of a motor-cycle or similar two-wheeled vehicle comprising means for turning the optical system about an axis close to the optical axis in dependence on the detected angle of inclination of the vehicle when turning, the detection being effected by means of a gyroscope unit.

14 Claims, 6 Drawing Figures

LIGHTING SYSTEMS FOR MOTOR CYCLES

CROSS REFERENCE TO RELATED APPLICATION

This invention is related to the invention described in my patent application Ser. No. 455,757 filed Mar. 28, 1974, now U.S. Pat. No. 3,939,339, which is incorporated herein by reference.

BACKGROUND OF THE INVENTION

This invention relates to lighting systems for motor cycles or similar two-wheeled vehicles. My earlier No. Pat. No. 3,939,339 referred to above describes a system for the automatic correction of the orientation of the beam of light of a motor-cycle or similar two-wheeled vehicle headlamp comprising means for turning at least the optical system of the headlamp about an axis of rotation adjacent the optical axis, and a transducer detector system adapted to detect the angle of inclination of the vehicle while turning, said means for turning the optical system of the headlamp being controlled by the transducer detector in such a manner that a compensating orientation variation is applied to the headlamp beam when the vehicle makes a turn.

There are described in the said earlier patent some electro-mechanical transducer detector systems which operate by means of the displacement against a bias of a mass or weight due to centrifugal force resulting from turning of the vehicle. Such systems operate satisfactorily but there is a desire to improve the reliability and accuracy of detection. It is difficult to ensure that the weight moves smoothly and reliably on turning and to ensure that it always moves by the same amount on repeated identical turns. Also the force on the weight is only indirectly related to the angle of inclination of the vehicle.

SUMMARY OF THE INVENTION

The present invention provides a system which is accurate and reliable but can be constructed relatively cheaply. The invention provides a system in which the transducer detector system comprises a gyroscope unit arranged to convert the inclination of the vehicle into an angular variation, the means for turning the headlamp optical system being controlled in dependence on the said angular variation. This significant angular variation is introduced into a compensated control network for the orientation of the headlamp optical system, preferably after having been converted into an electrical value. The output value of the gyroscope system can be converted electrically by means of potentiometers, strain gauges, capacitors, etc. The position of the headlamp optical system can in turn be detected electrically by a reference element (potentiometer or capacitor). The two electrical values are used in a control circuit for a motor which adjusts the position of the optical system.

In a preferred embodiment, a gyrometer detector is adapted to detect the speed of variation of the angle of inclination of the vehicle while turning and convert it to a mechanical displacement, the means for turning the optical system of the headlamp being controlled by the said displacement by means of a correction system comprising a transducer to convert the said mechanical displacement into an electrical value, an integrator for integrating this electrical value, a means for detecting the angular position of the optical system and a controlled unit receiving the output signal of the integrator, to control the means for rotation of the headlamp optical system in a direction tending to make the two signals received by the controlled unit equal, and a dead-zone element between the transducer and the integrator to deliver a signal to the integrator input only if the speed of variation of the angle of inclination as detected by the gyrometer is greater than a given threshold.

Any type of gyroscope system known in the art can be used, more particularly gyroscopes and gyrometers having one degree of freedom, in which the angular output value is linked to the detected angle of inclination. This type of equipment naturally includes integrating gyrometers, the angular output value of which is substantially proportional to the inclination detected. In one particularly cheap embodiment, a spring gyrometer is used in which a resilient restoring force is applied.

Many important objects and advantages of the present invention will become fully appreciated by those skilled in the art when reading the following description, with reference to the accompanying drawings illustrating a preferred embodiment of the invention.

DESCRIPTION OF THE PREFERRED EMBODIMENT

Figure 1:
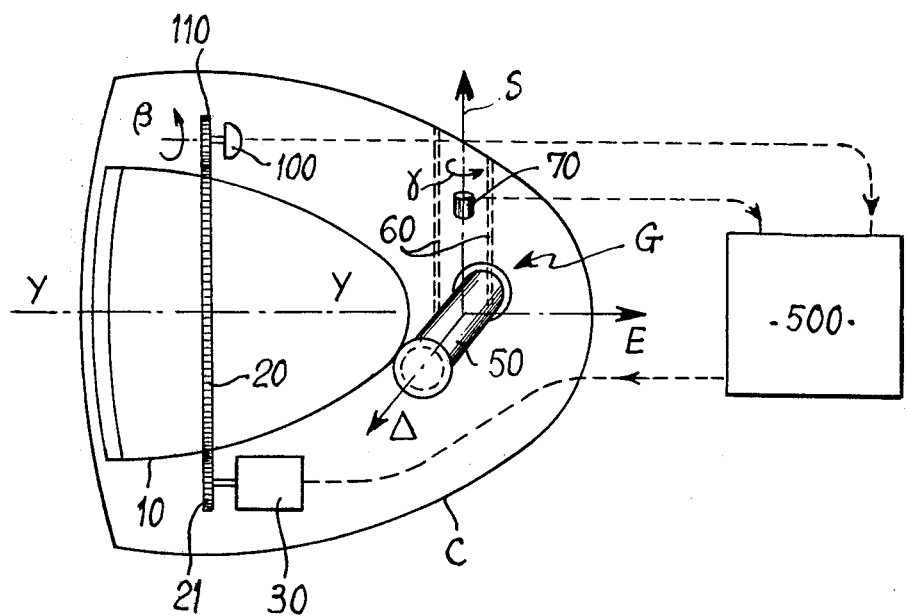
FIG. 1 is a diagrammatic side view of a system according to the invention and incorporating a gyroscope unit.

FIG. 1 shows a sealed-beam unit 10 fitted inside a stationary casing C mounted on a motorcycle, the unit 10 being rotatable about an axis Y—Y which either coincides with the optical axis or is inclined downwardly and forwardly slightly in relation to the optical axis as indicated in the said earlier patent.

Rotation of the sealed beam unit 10 about the axis Y—Y is obtained, as in the earlier patent, by means of a toothed ring 20 meshing with a gearwheel 21 driven by a reversible d.c. motor 30.

As in the earlier patent, the rotation of the sealed-beam unit 10 about the axis Y—Y is controlled in accordance with the inclination α of the motorcycle on turns.

The angle α is detected by a gyroscope unit which converts the angle to an angular variation. The preferred gyroscope unit G employed in the system being described is of the type having one degree of freedom, more particularly of the gyrometer type, although other kinds of gyroscope could be used. The rotor unit 50 of the gyrometer is rotatable about an axis Δ which, in the middle position, is a transverse horizontal axis perpendicular to the general plane of symmetry of the motorcycle; the rotor of the rotor unit 50 is started and its rotation is maintained by an electric motor (not shown).

The gyroscope detection system has an input axis E and an output axis S which together with the axis Δ form the coordinate axes of the gyroscope detection system. The axis E lies in the vertical fore-and-aft plane of the motorcycle substantially parallel to the line joining the points of contact of the two wheels with the ground. The inclination α of the motorcycle can thus be likened to a rotation about E.

Of course the arrangement of the axes Δ, E and S provides within the casing C a mounting for a gyrometer which is one of the known modes for employing gyrometers. A mounting assembly 60 is used for this purpose as shown diagrammatically in FIG. 1 and in principle comprises Cardan mounts which incorporate the axes Δ and S linked to the casing C forming the gyrometer casing.

The rotor unit 50 of the gyrometer is mounted on the casing by means of an assembly of flexible metal strips but other mounting means could be used instead.

When the motorcycle inclines through an angle α on a turn, the gyroscope system is sensitive to a rotation of α about its axis E. It reacts to this rotation by an angular displacement γ about the axis S. This displacement γ may be detected electrically, for example by means of a potentiometer 70.

If the gyroscope system G is a gyrometer (in which the predominant resilient restoring force is exerted about the output axis S), the detected angle γ is a linear function of the variation of the inclination α in time, $d\alpha/dt$.

If the gyroscope system G is of the integrating gyrometer type (in which there is a predominant viscous frictional force about S), the angle detected at the potentiometer 70 is proportional to the inclination. For reasons of economy it is generally preferable to use an apparatus of the resilient restoring force gyrometer type.

Figure 2:
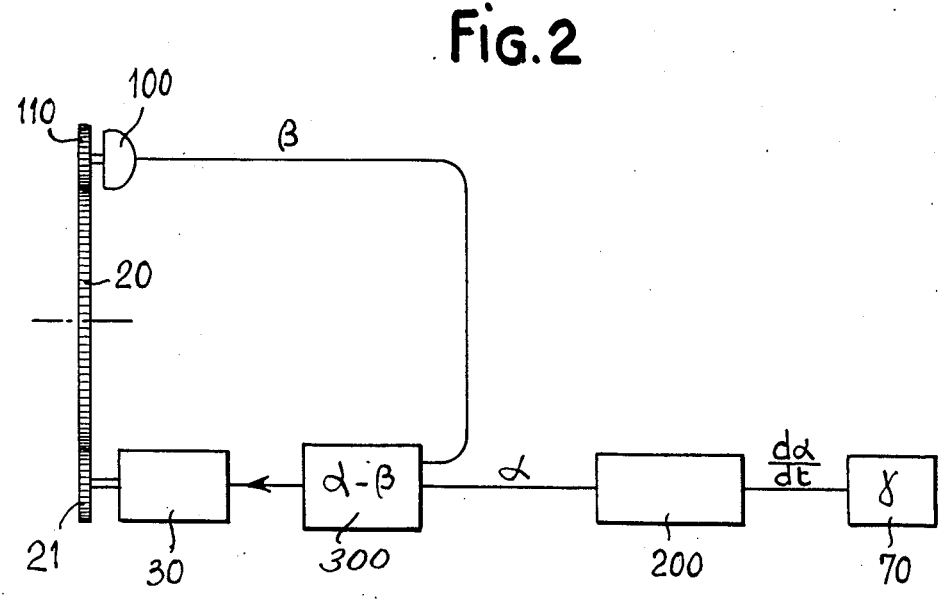
FIG. 2 is a diagram showing the control circuit for the optical system and the displacement motor in the system shown in FIG. 1.

The method of controlling the motor for rotating the optical system will now be described. The control circuit 500 (which can be incorporated into the casing C) is shown in outline in FIG. 2. A reference potentiometer 100 is used for this purpose, being driven by a gearwheel 110 meshing with the ring 20. The potentiometer 100 effectively detects the angle β through which the sealed-beam unit 10 turns. If a gyrometer is used, the potentiometer 70 delivers a signal proportional to $d\gamma/dt$. This electrical signal is fed to an integrator 200, the output of which gives a signal corresponding to the angle α. The signals from the integrator 200 on the one hand and from the potentiometer 100 on the other hand are fed to a comparator 300, the output of which controls the rotation of the motor 30 in either direction according to the difference $\alpha - \beta$. This is a very simple way of compensating for the inclinations α by compensatory rotation of the sealed-beam unit about Y—Y.

The potentiometer 70 may be replaced by any other transducer element, more particularly a strain gauge behaving electrically as a variable resistor; a strain gauge of this kind may be fitted on a suspension element of the gyroscope system to detect the rotation of the axis S.

The rotation of the sealed-beam unit 10 has been given by way of example; the only thing necessary, of course, is that the optical system participating in producing cut-off (dipped beam) should be rotated.

Figure 3:
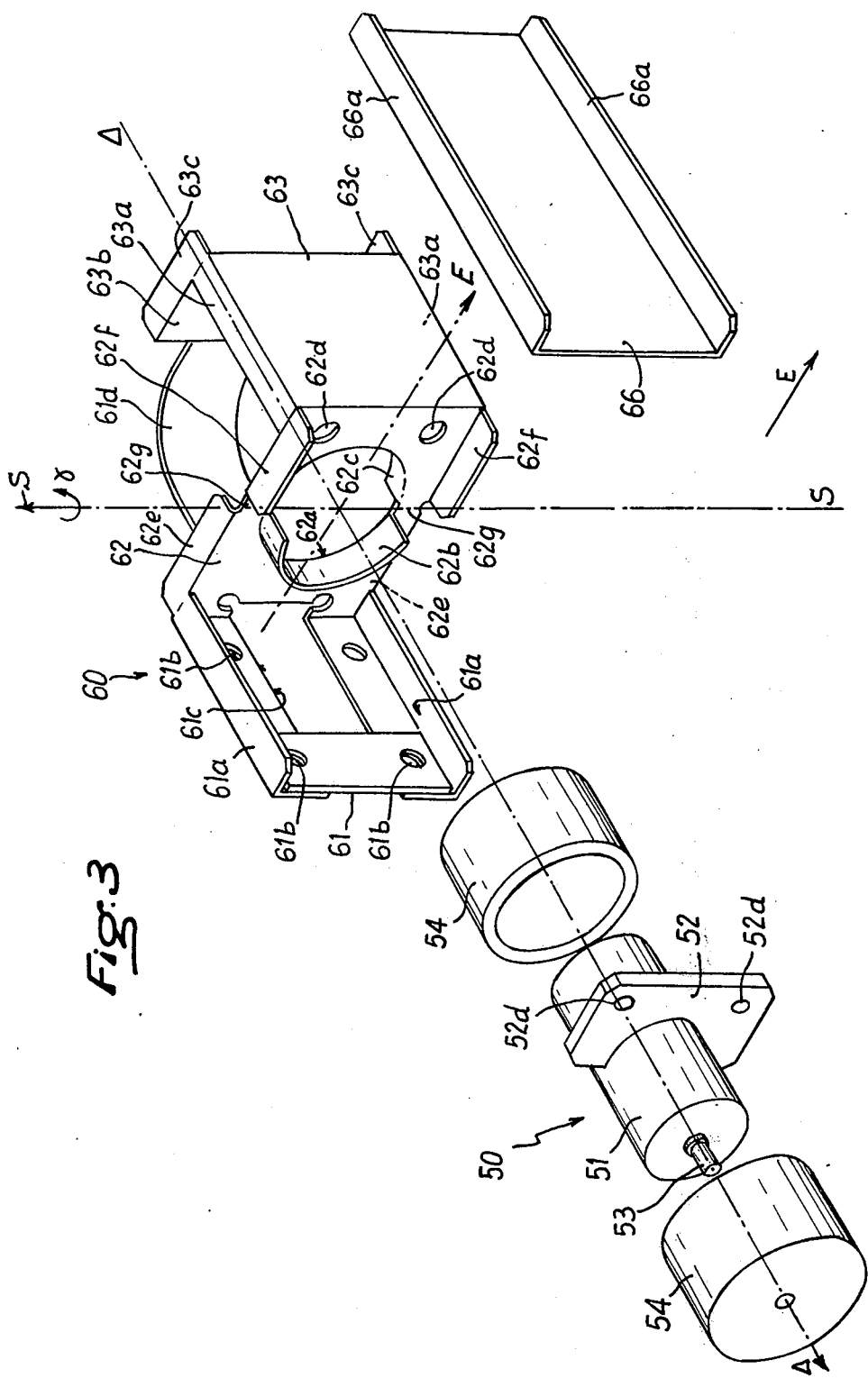
FIG. 3 is an exploded view of a gyrometer which may be used in the system shown in FIGS. 1 and 2.

The specific gyrometer shown in FIGS. 3 and 4 will now be described. This gyrometer is intended for fitting with its rotor unit extending along an axis Δ disposed in a substantially horizontal plane and perpendicular to the longitudinal axis of the optical system of the headlamp as shown in FIG. 1.

The gyrometer rotor unit 50 comprises an electric motor 51 on which a mounting yoke 52 is fixed. Two shaft ends 53 project from the two ends of the motor 51 and two metal cups 54 are mounted thereon and are driven by rotation of the shaft 53 about the axis Δ.

The support 60 for the rotor unit 50 is formed by a Z-shaped structure comprising a first longitudinal plate 61, a transverse plate 62, and a second longitudinal plate 63; plate 62 is perpendicular to the two plates 61 and 63. The support 60 is preferably made from a spring steel blank, which is appropriately stamped and bent.

The plate 61 has reinforcing flanges 61a extending parallel to the axis Δ, mounting apertures 61b and a central aperture 61c, the metal initially present in said aperture being bent back to form a tongue or resilient strip 61d.

The plate 62 has a central aperture 62a in which the motor 51 can fit, with two semicircular rims 62b and 62c disposed opposite one another with respect to the axis Δ and on either side of the general plane of the plate 62. Fixing apertures 62d are formed at one end of the plate 62. Finally, the plate 62 has two pairs of transverse flanges 62e and 62f extending in opposite directions parallel to the axis.

The flanges 62e and the rim 62b on the one hand, and the flanges 62f and the rim 62c on the other hand together define two reduced-thickness non-rigid zones 62g which are diametrically opposed with respect to the axis Δ, thus defining a flexure axis S. It is fundamental that the entire plate 62 can readily be bent about S but not in any other direction.

The plate 63 is provided with strengthening flanges 63a and a return projection 63b disposed parallel to the plate 62 and provided with strengthening flanges 63c.

The strip 61d which is bent back by cutting out the aperture 61c is welded at its free end to the projection 63b at points 63f. In this way, the resilient strip 61d can exert a resilient restoring force to relative rotation about the axis S of the two plates 61 and 63.

On assembly, the motor 50 is fitted by its yoke 52 to the plate 62, the apertures 62d in the plate 62 cooperating with apertures 52d formed in the yoke to receive bolts.

When the support 60 is secured to the casing C of the headlamp (or to any other element connected to the motorcycle) by means of the fixing apertures 61b in the plate 60, the rotor unit 50 connected to the part of the plate 62 formed with the apertures 62d can move by rotating about the axis S, the strip 61d then developing a resilient restoring force which tends to return the rotor unit to a middle position.

The rotation γ of the rotor unit 50 about the axis S may be detected by combining the plate 63 with a second plate 66 provided with flanges 66a, for example by welding them together. The two plates 61 and 66 then form supports extending parallel to one another and the relative distance between these two supports can be detected by any suitable electromechanical transducer to convert it to an electrical magnitude representing the rotation γ. It is alternatively possible to use a strain gauge disposed on strip 61d.

The relative displacement of the two supports through the angle γ is proportional to the angular velocity of displacement of the gyrometer assembly about axis E perpendicular to the axis Δ and to the axis S.

In the construction being described, the supports 61 and 66 are used to carry — by means of insulating mountings — parallel capacitor plates $P_1$, $P_2$ (connected to plate 66) and $P_3$ (connected to plate 61). The plates $P_1$ and $P_3$ define a variable capacitor $C_1$ and the plates $P_2$ and $P_3$ define a second variable capacitor $C_2$. The capacitance of these capacitors varies according to the spacing of the plates 61 and 66 and therefore according to the angular velocity of the gyrometer about the axis E as a result of an inclination of the motorcycle.

The capacitors $C_1$, $C_2$ thus defined form the elements which introduce the value of the angle of inclination of the motorcycle into the detection and control network.

Figure 5:
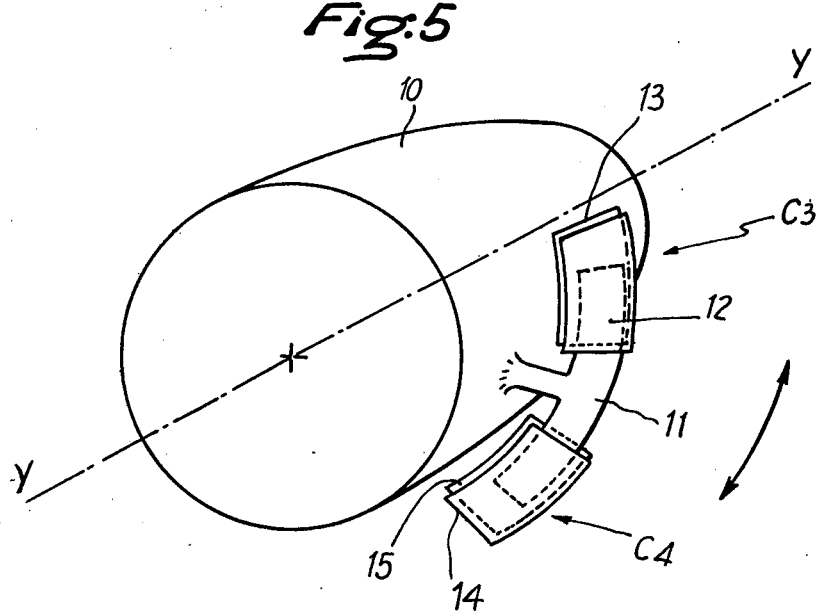
FIG. 5 is a highly diagrammatic illustration of means for the detection of the movement of the headlamp optical system by means of capacitors and which may be used in the system shown in FIGS. 1 and 2.

To provide feed-back of the position of the optical system 10 of the headlamp about its axis Y—Y (FIG. 1), the detection system illustrated diagrammatically in FIG. 5 may be used. In an assembly of this kind, the sealed-beam unit 10 rotatable about the axis Y—Y is connected to a plate 11 extending over an arc of a circle about the axis Y—Y and made from a dielectric material. Two pairs of capacitor plates (12, 13) and (14, 15) enclose the dielectric 11. The plates 12, 13, 14, 15 are fixed and the dielectric together with the two pairs of plates defines two variable capacitors $C_3$ and $C_4$ respectively, the variation of the capacitances of these capacitors being linked with the angular position of the optical system 10 with respect to the axis Y—Y.

The capacitors $C_3$, $C_4$ form the elements which introduce the angular position of the optical system 10 about the axis Y—Y into the control network. The capacitors $C_3$, $C_4$ thus have an equivalent function to that of the potentiometer 100 in FIG. 1.

The electronic detection and control network will now be described with reference to FIG. 6. The object of this network is to supply an electric motor orienting the headlamp about the axis Y—Y (FIG. 5) with a control signal dependent upon the indication of the gyrometer and the indication of the system for detecting the angular position of the headlamp, so as to modify such position according to the signal delivered by the gyrometer.

The rotation of the headlamp about the axis Y—Y must be in the same sense as the inclination of the motorcycle and have a value proportional to such inclination (preferably equal to the latter). For this purpose, the complete detection and control network shown in FIG. 6 comprises the following: a gyrometer signal detector consisting essentially of a capacitor bridge including the capacitors $C_1$ and $C_2$ in FIG. 4, this detector being adapted to give an output signal as a linear function of the angle of inclination of the motorcycle; an integrator to integrate the output signal of the gyrometer signal detector, thus giving a signal proportional to the inclination of the motorcycle; a detector for the angular position of the headlamp about its axis Y—Y, such detector consisting essentially of a second capacitor bridge including the capacitors $C_3$ and $C_4$ in FIG. 4, said detector being adapted to deliver a signal as a linear function of the angular position of the headlamp; and an amplifier unit receiving the gyrometer signal after integration and a signal originating from the angular position detector, said amplifier unit controlling the rotation of a headlamp rotating motor until the two input signals supplied to the amplifier unit are made equal, i.e. until the inclination of the motorcycle has been compensated by a corresponding rotation of the headlamp.

The circuit diagram shown in FIG. 6 will now be described in greater detail.

Figure 4:
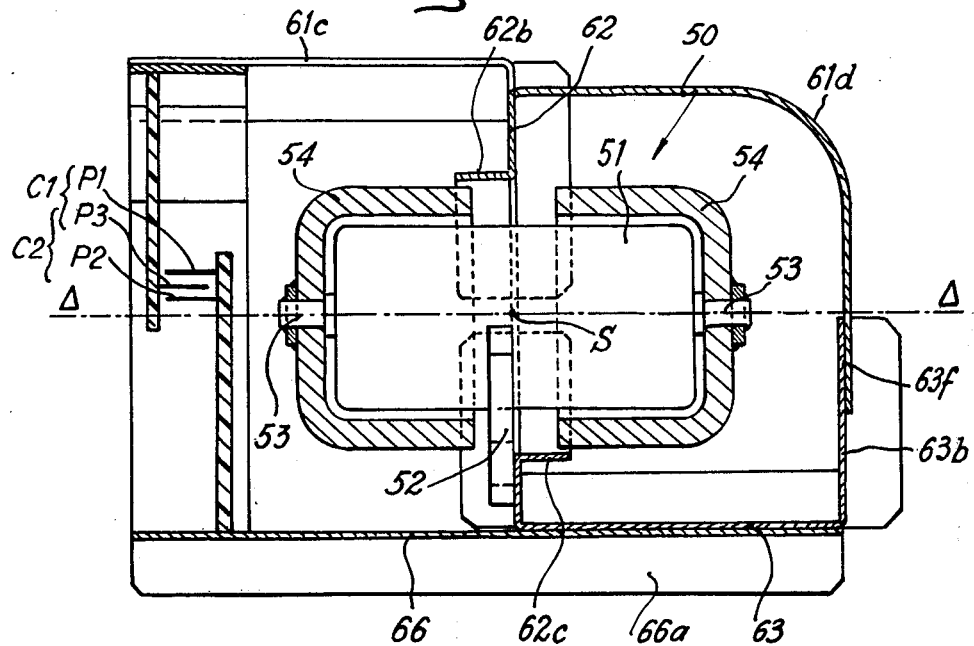
FIG. 4 is a horizontal section of this gyrometer.

The gyrometer signal detector comprises a bridge of four capacitors including the variable capacitors C1 and C2 of FIG. 4 with a common plate, thus forming two adjacent arms of the bridge; the other two arms comprise fixed capacitors C'1 and C'2.

An a.c. voltage supply VA is provided for the bridge and is connected between the end plates of the group of capacitors C1 and C2.

A bridge unbalanced signal is taken off between the common point of the capacitors C'1 and C'2 and the common plate of C1 and C2. This unbalance signal has a specific value when the gyrometer does not deliver any signal and hence, in principle, when the common plate of C1 and C2 is equidistant from the end plates P1 and P2 of this group of capacitors. Appropriate choice of C'1 and C'2 enables this specific inbalance signal value to be obtained. The unbalance signal is a voltage which is a linear function of the displacement of the movable plate from its central position and hence a linear function of the angle of inclination of the motorcycle.

The bridge unbalance signal is amplified in a amplifier A1 and then rectified in a rectifier unit RD1 (comprising diodes and very low frequency smoothing capacitances). The output of the rectifier RD1 is a d.c. voltage which is a linear function of the angle of inclination of the motorcycle and greater or less than (depending upon the direction of such inclination) a reference voltage connected to the non-inverting input of an amplifier A2 disposed at the output of RD1.

Before being integrated, this d.c. voltage passes through an electronic sub-group M which is intended to cancel it if it is below a certain level, so that the control network disregards very small variations in inclination of the motorcycle.

The sub-group M which provides this "dead zone" function comprises the amplifier A2 connected as a unity-gain amplifier by means of equal input and negative feedback resistors (R1) if there are adequate voltages at its input; it also comprises a diode bridge connected for negative feedback between its output and its input, the diode bridge being so biased that all the diodes conduct in the case of low output signals from the amplifier A2 and at least one of the diodes is cut off for output voltages from the amplifier greater than the dead zone threshold, the gain of A2 becoming unity. This "dead zone" sub-group M operates symmetrically, i.e. in the same way for input voltages above the reference voltage (inclination of motorcycle in one direction) and for input voltages below the reference voltage (inclination in the other direction).

Figure 6:
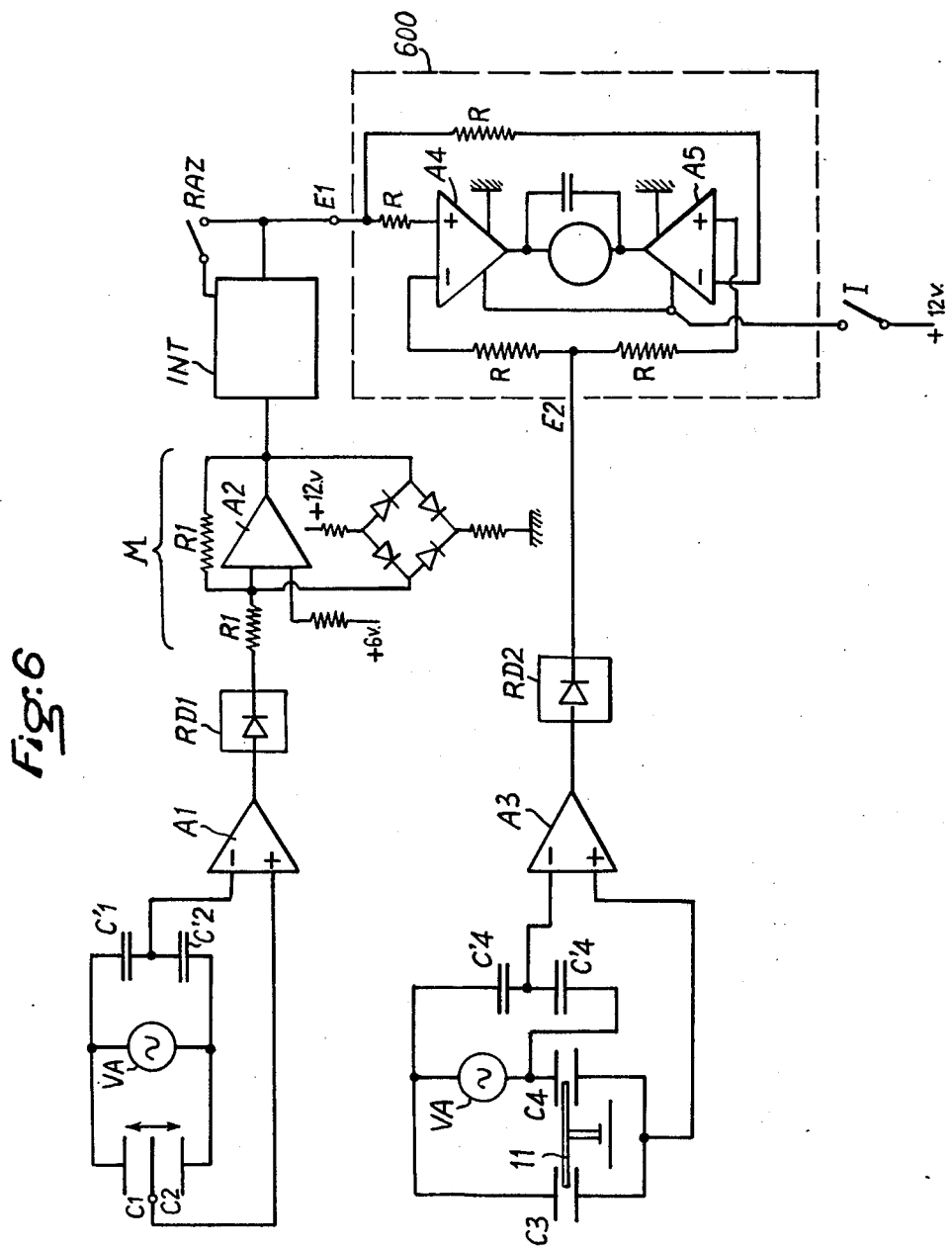
FIG. 6 is a diagram of a control and detection network using the gyrometer shown in FIGS. 3 and 4 and detection by capacitors as shown in FIG. 5.

The output voltage of the amplifier A2 is integrated in an integrator INT which delivers a signal proportional to the inclination of the motorcycle, and this signal is used as the first input E1 for the amplifier unit denoted by the broken-line rectangle 600 in FIG. 6.

The output signal of the integrator can be reset to zero by a switch RAZ which may either be a press-button actuated by the motorcycle rider, or an automatic switch closing when the motorcycle is travelling in a straight line (zero inclination). The integrator is subject to a possible drift, even in the absence of a signal at its input (zero inclination or a sufficiently small inclination to remain within the dead zone), and this drift must occasionally be cancelled, preferably automatically, by arranging for the switch RAZ to close as soon as the motorcycle is straightened. If the switch is not automatic, the rider must actuate it from time to time when he is travelling in a straight line.

The controlled amplifier unit 600 has a second input E2 which receives d.c. voltage proportional to the angular position of the headlamp about its axis Y—Y.

This voltage is produced from a capacitor bridge including the capacitors C3 and C4 in FIG. 5, whose capacitance is variable by means of the dielectric 11 which is movable with the headlamp. The circuit of the capacitors C3 and C4 is symmetrical when the headlamp is in its starting position (given a zero inclination of the motorcycle), so that a given increase in the capacitance of the capacitor C3 due to penetration of the dielectric 11 between the plates of C3 produces a corresponding reduction in the capacitance of the capacitor C4.

The capacitors C3 and C4 are connected in two adjacent arms of the bridge, to the terminals of which an a.c. voltage is connected, which may be the same (VA) as for the first capacitor bridge (C1, C2, C'1, C'2). The other two arms of the bridge are formed by two capacitors C'3 and C'4. The bridge unbalance signal is taken off between the common point of C'3 and C'4 and the common point of C3 and C4. The capacitors C'3 and C'4 are so selected that the unbalance signal has a given value when the headlamp is in its starting position equivalent to zero inclination of the motorcycle.

This unbalance signal is amplified in an amplifier A3 and rectified in a rectifier unit RD2 comprising, for example, a diode bridge and very low frequency smoothing capacitors to provide a d.c. voltage at the output, the difference between the d.c. output and the reference voltage being proportional to the angle of rotation of the headlamp from its starting position.

The d.c. signal at the output of the rectifier unit RD2 is fed to the input E2 of the amplifier unit 600.

The amplifier unit 600 comprises two differential amplifiers A4 and A5, the outputs of which are each connected to one terminal of a motor M rotating the headlamp about its axis Y—Y. The input signals to the amplifiers A4 and A5 are symmetrical so that if the A4 output voltage is positive, the A5 output is negative and equal, as an absolute value, to that of A4, and the motor rotates in one direction; conversely, if the output voltage of A4 is negative, the output of A5 is positive and the motor rotates in the other direction. The motor remains stationary only if the output voltages of the amplifiers A4 and A5 are zero. The arrangement is therefore such that the direction of the variations of the capacitances C3 and C4 due to rotation of the headlamp acts to cancel out the voltages of the amplifiers.

For this purpose, the input terminal E1 of the amplifier unit 600 is connected to the non-inverting input of A4 via a resistor R and to the inverting input of A5 via another resistor R and, conversely, input E2 is connected to the inverting input of A4 via a resistor R and to the non-inverting input of A5 via another resistor R.

In this way, rotation of the headlamp is always effected so that the voltage at the terminal E2 remains equal to the voltage at the terminal E1.

Of course, the coefficient of amplification of the network between the value of the displacement of the common plate of the capacitors C1 and C2, and the voltage at E1, and the coefficient of amplification between the value of the displacement of the dielectric 11 and the d.c. voltage at E2, are so selected that the headlamp turns through a selected angle for a given inclination of the motorcycle, e.g. an angle equal to the angle of inclination.

The arrangements selected for the capacitor bridges C1, C2 and C3, C4 are particularly advantageous because they give voltage signals proportional to the measured values (angle of inclination of the motorcycle or angle of rotation of the headlamp).

However, other types of detectors (for example strain-gauge detectors or inductive detectors operating by displacement of plunger cores) may be used, the main thing being that the signals at the terminals E1 and E2 should be as linear as possible as a function of the values they measure.

The gyrometer signal detector may be a system comprising capacitors similar to that of the angular position detector, i.e. with a dielectric moving between the plates and parallel thereto.

FIG. 6 also shows a switch I whereby the voltage of a battery can be connected to the amplifiers of the electronic unit in FIG. 6, more particularly amplifiers A4 and A5, the switch I preferably being the same as the switch used for lighting the headlamp (main-beam or dipped-beam) so that the system for correcting the orientation operates only when the headlamp is lit.

The capacitors of the two bridges are fed by a.c. voltages VA which can be produced either by the motorcycle alternator where one is provided or by a chopper from the battery d.c. voltage, or an oscillator. The voltage VA may be about 10 volts and its frequency may be selected according to the capacitances of the capacitors, e.g. 500 Hz.

What I claim as my invention and desire to secure by Letters Patent is:

1. A headlight system for use with a two-wheeled vehicle, such as a motorcycle, comprising,
    an optical system for producing a beam of light, said optical system having an optical axis along which light is projected therefrom,
    a gyroscope unit pivotable about an axis, the angular position of said gyroscope unit about said gyroscope axis at any moment being a function of the angle of inclination which the vehicle makes at that moment with the vertical, and
    means responsive to the angular position of said gyroscope unit for rotating said optical system about an axis extending in a front-to-rear direction of said optical system and at no more than a small acute angle to said optical axis, the angular position of said optical system with respect to said optical system axis at any moment being a function of the angular position of said gyroscope unit at that moment.

2. A system according to claim 1 wherein said means for rotating said optical system comprises a reversible electric motor and an electrical control circuit which is connected to supply said motor and comprises an element for detecting the angular position of said optical system and an element for detecting the angular variation of said gyroscope unit.

3. A system according to claim 1 wherein said gyroscope unit is a gyrometer.

4. A system according to claim 3 wherein said gyrometer comprises a rotor unit mounted on a support formed by a central plate and two side plates perpendicular to said central plate, the gyrometer rotor unit being fixed to the central plate and the central plate comprising zones of lesser stiffness allowing its flexure about a central transverse flexure axis, said two side plates being connected by a resilient strip which produces a restoring force when said rotor unit is moved from its middle position about the flexure axis.

5. A system according to claim 4 wherein said side plates and said central plate have strengthening flanges to resist flexure other than flexure about the said flexure axis.

6. A system according to claim 4 wherein said support is made from a single metal blank of spring steel.

7. A system according to claim 4 wherein said rotor unit of said gyrometer comprises an electric motor having a stator mounted on said support and a rotor having two shaft ends on which cup-shaped elements are mounted.

8. A system for the automatic correction of the orientation of the beam of a headlamp of a motorcycle or similar two-wheeled vehicle, said headlamp having an optical system for producing a beam of light and said optical system having an optical axis along which light is projected therefrom, said automatic correction system comprising means for turning at least the optical system of the headlamp about an axis of rotation extending in a front-to-rear direction of the optical system and at no more than a small acute angle to the optical axis, and a gyrometer detector adapted to detect the angle of inclination of the vehicle while turning and convert it to a mechanical displacement, the means for turning the optical system of the headlamp being controlled by the said displacement by means of a correction system comprising a transducer to convert the said mechanical displacement into an electrical value, an integrator for integrating this electrical value, a means for detecting the angular position of the optical system and a controlled unit receiving the output signal of the optical system angular position detector and the output signal of the integrator, to control the means for rotating the headlamp optical system in a direction tending to make the two signals received by the controlled unit equal, and a dead-zone element between the transducer and the integrator to deliver a signal to the integrator input only if the variation of the angle of inclination as detected by the gyrometer is greater than a given threshold.

9. A system according to claim 8 wherein the transducer comprises a capacitor bridge including two capacitors having a common movable plate between two parallel plates, the displacement of the movable plate modifying the ratio of the capacitances of the two capacitors formed by the said three plates, and the displacement of the movable plate being linked to the said mechanical displacement of the gyrometer.

10. A system according to claim 9 wherein said capacitor bridge comprises two other capacitors and means for connecting an a.c. voltage to the end plates of the first two capacitors, and a connection for taking the bridge unbalance signal from between the common points of the two groups of two capacitors so that the said unbalance signal is proportional to the displacement of the movable plate with respect to a middle position in which it is equidistant from the two fixed plates.

11. A system according to claim 8 wherein said transducer comprises a capacitor bridge including in two adjacent arms two capacitors between which a common movable dielectric can penetrate, which is linked to the movement of the optical system to modify the ratio of the capacitances of these two capacitors according to the direction of displacement of the dielectric, the bridge also comprising two other capacitors and a connection for taking bridge unbalance signal from between the common points of the capacitors of the two groups of capacitors, the unbalance signal being substantially proportional to the displacement of the dielectric with respect to a middle position.

12. A system according to claim 8 wherein said optical system angular position detector comprises a capacitor bridge including two capacitors having a common movable plate between two parallel plates, the displacement of the movable plate modifying the ratio of the capacitances of the two capacitors formed by the said three plates, and the displacement of the movable plate being linked to the said mechanical displacement of the gyrometer.

13. A system according to claim 12 wherein said capacitor bridge comprises two other capacitors and means for connecting an a.c. voltage to the end plates of the first two capacitors, and a connection for taking the bridge unbalance signal from between the common points of the two groups of two capacitors so that the said unbalance signal is proportional to the displacement of the movable plate with respect to a middle position in which it is equidistant from the two fixed plates.

14. A system according to claim 8 wherein said detector for the optical system angular position comprises a capacitor bridge including in two adjacent arms two capacitors between which a common movable dielectric can penetrate, which is linked to the movement of the optical system to modify the ratio of the capacitances of these two capacitors according to the direction of displacement of the dielectric, the bridge also comprising two other capacitors and a connection for taking bridge unbalance signal from between the common points of the capacitors of the two groups of capacitors, the unbalance signal being substantially proportional to the displacement of the dielectric with respect to a middle position.

* * * * *